US006739282B1

(12) United States Patent
Yuan

(10) Patent No.: US 6,739,282 B1
(45) Date of Patent: May 25, 2004

(54) BELL ASSEMBLY HAVING ACTUATABLE CLAPPER

(76) Inventor: Jui Jen Yuan, No. 86, Gien Gong Street, East Dist., Taichung (TW), 401

(*) Notice: Subject to any disclaimer, the term of this patent is extended or adjusted under 35 U.S.C. 154(b) by 0 days.

(21) Appl. No.: 10/397,899

(22) Filed: Mar. 26, 2003

(51) Int. Cl.[7] .................................................. G01K 1/10

(52) U.S. Cl. ....................... 116/167; 116/148; 116/155; 116/164; 446/397; 446/422; 84/402; 84/406; 84/103

(58) Field of Search ................................ 116/167, 148, 116/150, 154–155, 164, 171–172, 25, 151–152, 156–160; 446/397, 404, 408, 418, 421–422; 84/402–404, 406, 408, 102–103

(56) References Cited

U.S. PATENT DOCUMENTS

| | | | | | |
|---|---|---|---|---|---|
| 239,013 | A | * | 3/1881 | Connell | 116/155 |
| 247,610 | A | * | 9/1881 | Butler | 116/155 |
| 264,226 | A | * | 9/1882 | Beach | 116/2 |
| 599,988 | A | * | 3/1898 | Sanford | 116/164 |
| 1,349,694 | A | | 8/1920 | Roy | |
| 6,125,785 | A | * | 10/2000 | Asheri | 116/148 |

* cited by examiner

*Primary Examiner*—Diego Gutierrez
*Assistant Examiner*—Tania C. Courson
(74) *Attorney, Agent, or Firm*—Charles E. Baxley

(57) ABSTRACT

A bell device includes a securing device attached to a bell member, a seat rotatably secured to the securing device with a shaft and rotatable relative to the securing device about the shaft, and a resilient member having one end secured to the seat and a clapper secured to the other end. An actuator rod may rotate the seat relative to the securing device, to actuate the clapper to strike against the bell member and to make sounds, without moving the bell member. A spring member may bias the seat to disengage the clapper from the bell member. The clapper may be caused to strike against the bell member when shaking or moving the bell member.

16 Claims, 5 Drawing Sheets

BELL ASSEMBLY HAVING ACTUATABLE CLAPPER

BACKGROUND OF THE INVENTION

1. Field of the Invention

The present invention relates to a bell assembly, and more particularly to a bell assembly including an actuatable clapper for striking bell body without moving or shaking the bell body.

2. Description of the Prior Art

Typical bells comprise a bell body, and a jinglet, sounder, hammer, tongue, striker or clapper disposed in the bell body, and movable to strike against the bell body, in order to make various sounds. Normally, the bell body is required to be moved, shaken, vibrated, or oscillated by the users, in order to make the sounds.

For example, U.S. Patent No. 1,349,694 to Roy discloses one of the typical bells that comprise a striker or clapper disposed in the bell body, for striking against the bell body to make various sounds. The bell body should also be shaken or oscillated by the users, in order to make the sounds.

The typical clock towers or bell towers may comprise one or more huge bells each having a striker or clapper disposed in the bell body, and a huge and/or complicated actuating device may be provided to rotate or to oscillate the bell body, for allowing the clapper to strike against the bell body, in order to make various sounds. The actuating device normally comprises a complicated configuration that may not be easily manufactured and installed in the bell towers.

For the huge bells of the other typical clock towers or bell towers, a huge and/or complicated actuating device may be provided to move or to oscillate the clapper, to force the clapper to strike against the bell body, in order to make various sounds. The actuating device normally also comprises a complicated configuration that may not be easily manufactured and installed in the bell towers. The huge bells of the typical bell towers may not be moved or shook by the users.

The present invention has arisen to mitigate and/or obviate the afore-described disadvantages of the conventional bell assemblies.

SUMMARY OF THE INVENTION

The primary objective of the present invention is to provide a bell assembly including an actuatable clapper for striking onto the bell body without moving or shaking the bell body, and allowable to strike onto the bell body by moving or oscillating or shaking the bell body.

In accordance with one aspect of the invention, there is provided a bell assembly comprising a bell member, a securing device attached to the bell member, a seat rotatably secured to the securing device with a shaft, and rotatable relative to the securing device about the shaft, a resilient member including a first end secured to the seat, and including a second end, a clapper secured to the second end of the resilient member, means for rotating the seat relative to the securing device, to actuate the clapper to strike against the bell member, and to make sounds, without moving the bell member, and means for biasing the seat to engage with the securing device, and to disengage the clapper from the bell member. The clapper is allowed to strike against the bell member when shaking the bell member by users.

The bell member includes an aperture formed therein, the securing device includes a panel engaged with the bell member and a conduit extended from the panel and engaged through the aperture of the bell member, to secure the securing device to the bell member. The securing device includes at least one ear extended from the panel thereof and having a hole formed in the ear, to receive the shaft.

A housing is further provided and includes a plate having a barrel extended therefrom, the barrel includes a bore formed therein to receive the conduit, the panel of the securing device may force the bell member toward the plate of the housing, to secure the bell member in the housing.

The securing device includes a catch extended from the conduit, to engage with the barrel and to secure the conduit to the barrel. The barrel includes a peripheral shoulder formed therein to receive the catch of the securing device, and to lock the conduit to the barrel. The conduit of the securing device may include a slot formed therein to increase a resilience of the catch, and to allow said catch to detachably lock the conduit to the barrel.

The housing includes a first end having the plate provided thereon, and a second end having a peripheral skirt provided thereon, and at least one opening formed therein to form at least one bar therein, the bar is coupled between the plate and the peripheral skirt of the housing.

The housing includes at least one pad attached to the peripheral skirt to make a point-contact with supporting surfaces. The housing includes at least one projection extended from the plate thereof, and engaged with the bell member, to make a point-contact with the bell member.

A handle may further be provided and secured to the barrel of the housing, and moved in concert with the housing. The rotating means includes a rod slideably received in the handle and in the conduit of the securing device, and the rod includes an inner end engage able with the seat, to rotate the seat relative to the securing device against the biasing means when the rod is moved relative to the handle.

The conduit includes a bore formed therein, and a peripheral rib extended radically into the bore thereof, to engage with the rod, and to guide the rod to move axially along the conduit. The handle includes a bore formed therein to slideably receive the rod, and includes a peripheral flange extended into the bore thereof, to engage with the rod and to limit the rod to move relative to the handle.

The rod includes a knob secured thereto and extended out of the handle for being depressed by users. The rod includes a first end extendible out of the handle, and means for biasing the first end or the knob of the rod out of the handle, and to disengage the inner end of the rod from the seat.

The aperture of the bell member includes a non-circular cross section, the conduit includes a non-circular cross section to mate with the non-circular aperture of the bell member, and to prevent the securing device from rotating relative to the bell member.

Further objectives and advantages of the present invention will become apparent from a careful reading of the detailed description provided hereinbelow, with appropriate reference to the accompanying drawings.

and

Figure 3:
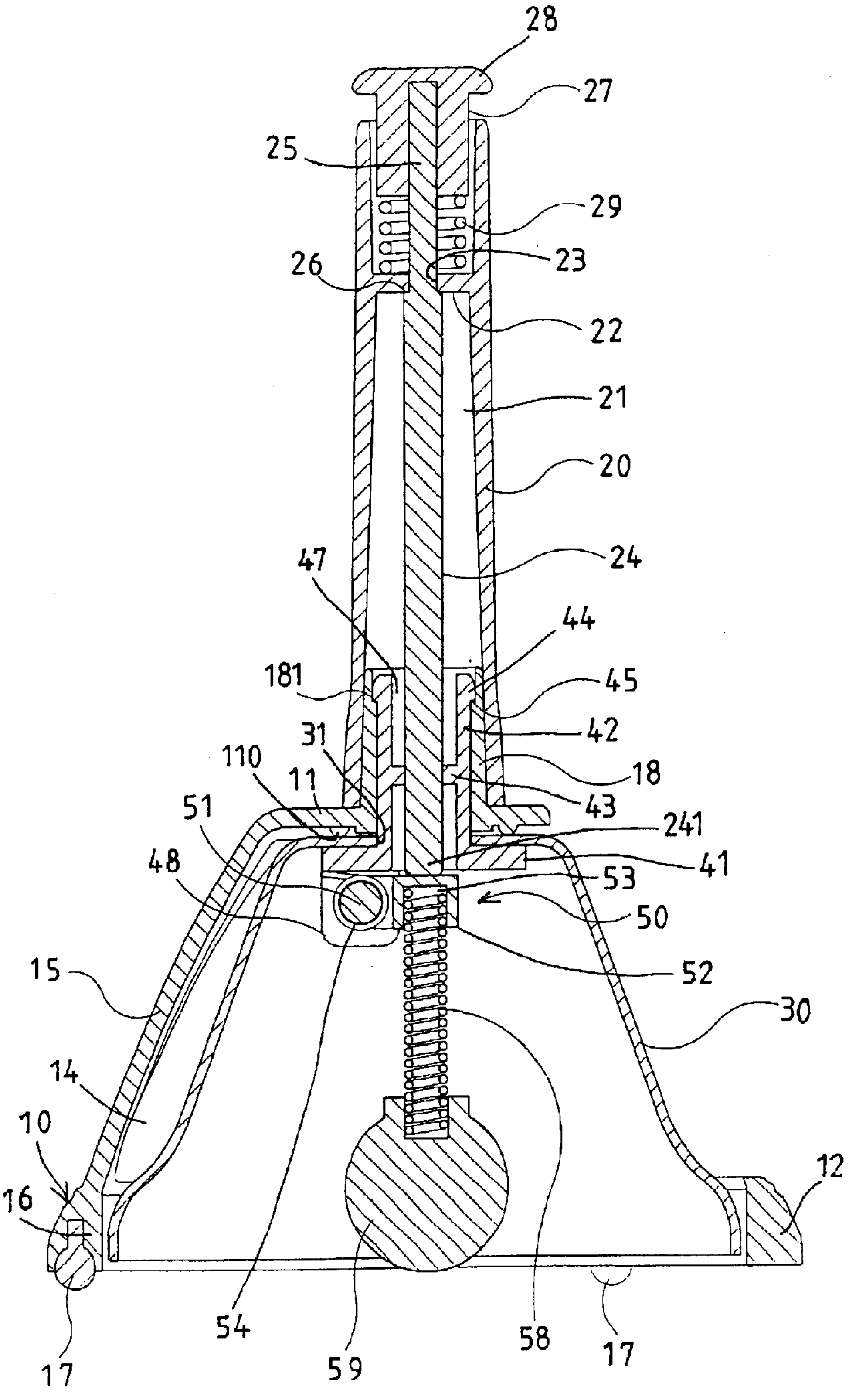
FIG. 3 is a cross sectional view taken along lines 3—3 of FIG. 2.
Figure 4:
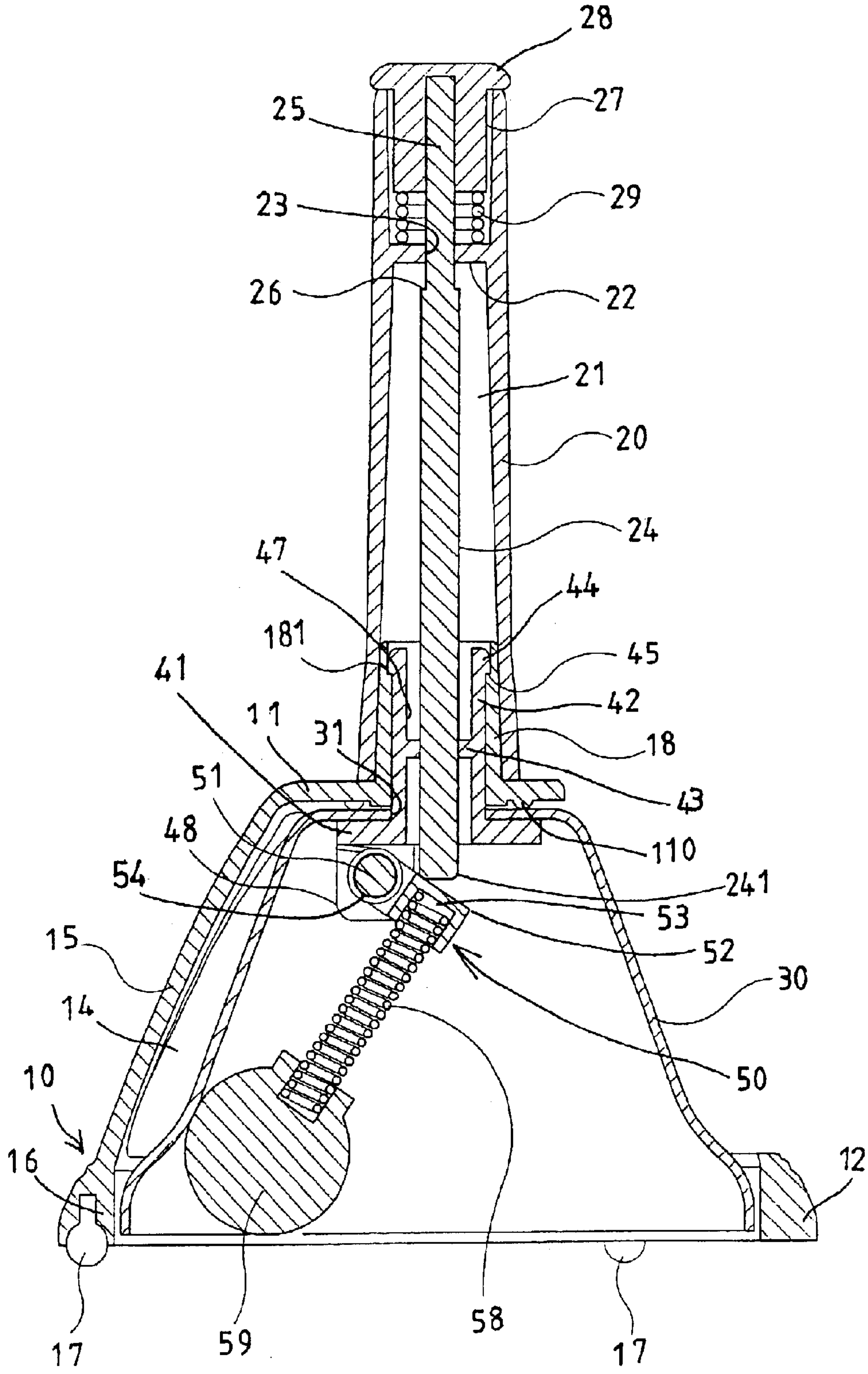
Figure 5:
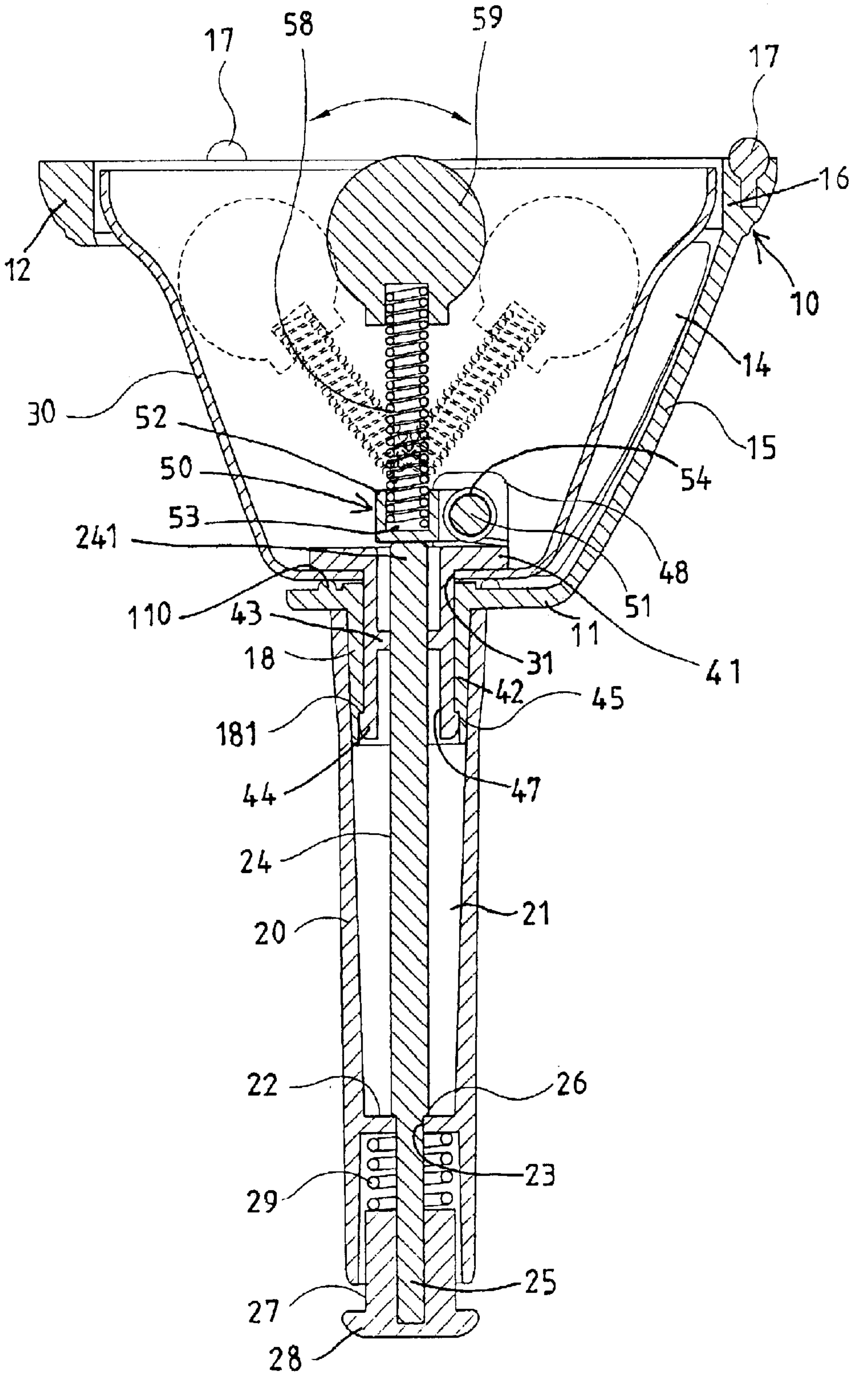

FIGS. 4 and 5 are cross sectional views similar to FIG. 3, illustrating the operation of the bell assembly.

DETAILED DESCRIPTION OF THE PREFERRED EMBODIMENT

Figure 1:
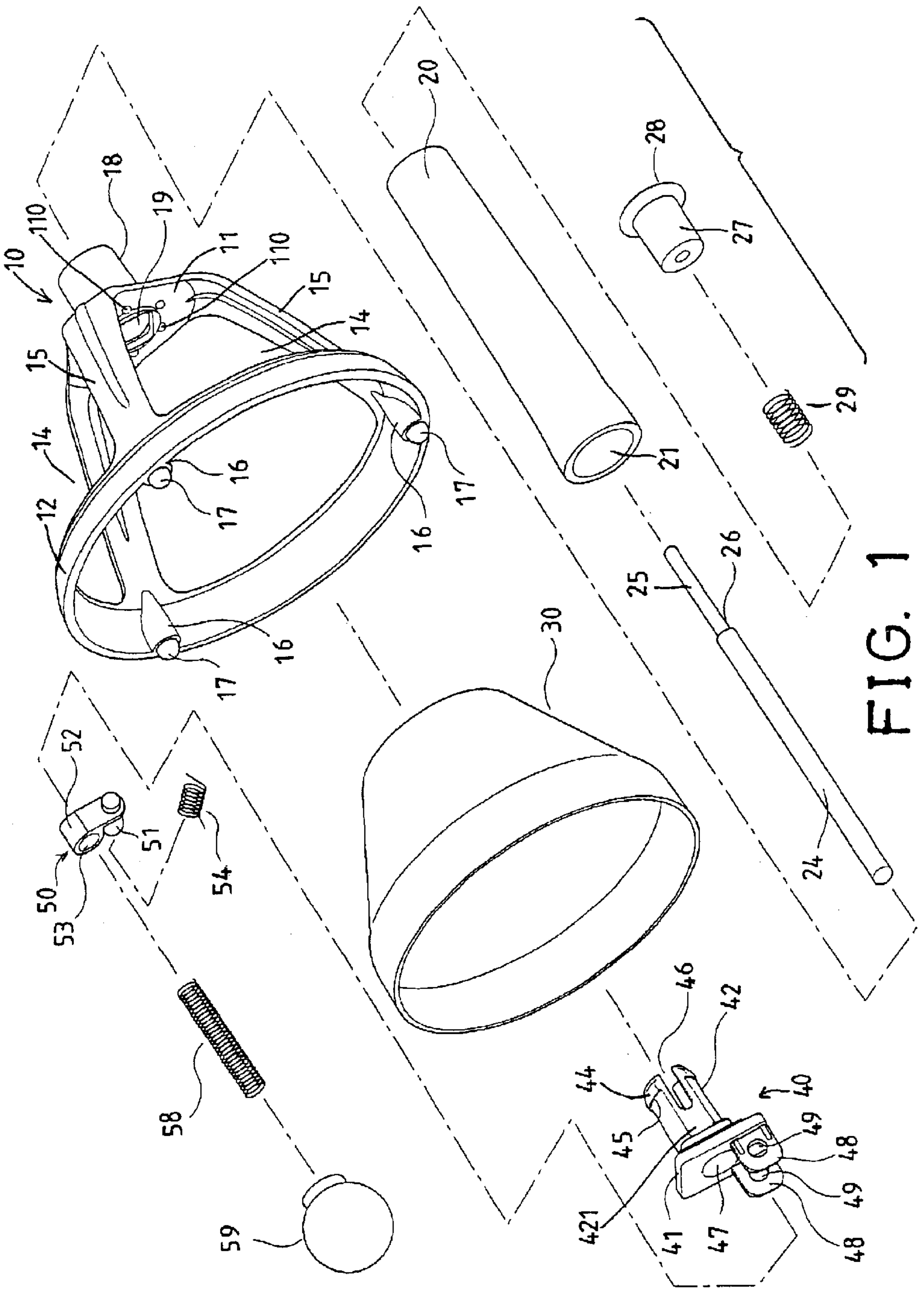
FIG. 1 is an exploded view of a bell assembly in accordance with the present invention.
Figure 2:
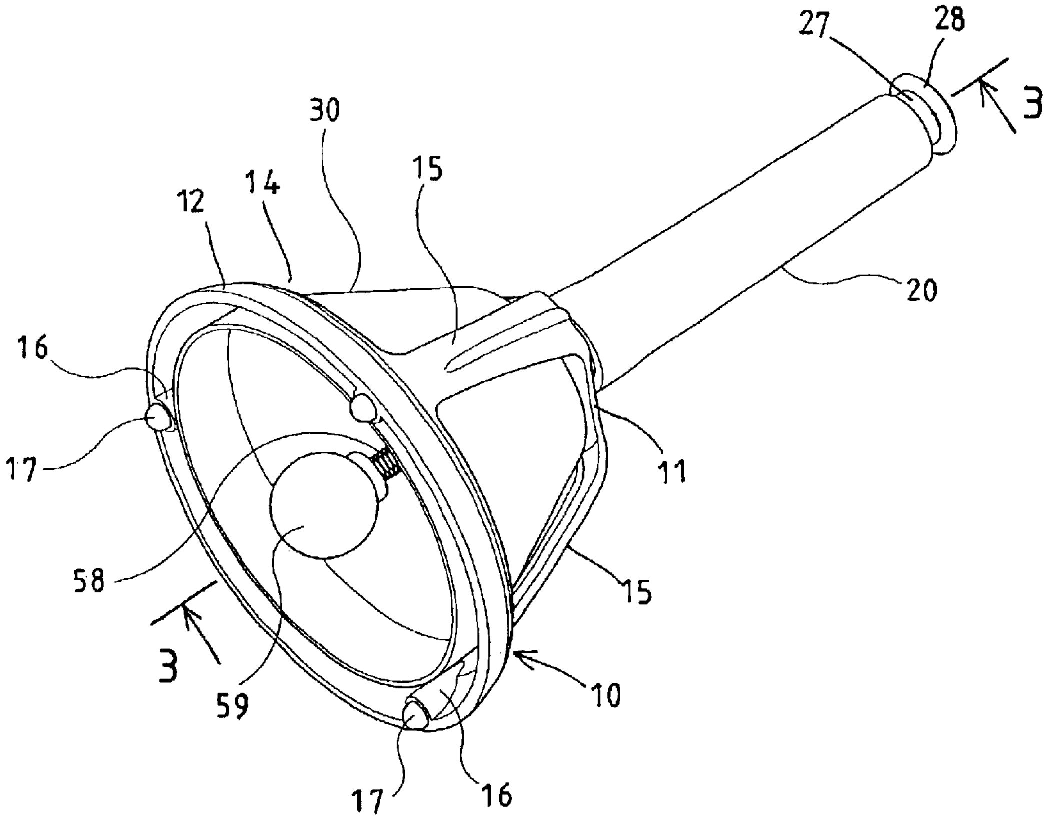
FIG. 2 is a perspective view of the bell assembly.

Referring to the drawings, and initially to FIGS. 1–3, a bell assembly in accordance with the present invention comprises a housing 10 including a substantially bell-shaped structure having a plate 11 provided on one end thereof, a peripheral skirt 12 formed or provided on the other end thereof, and one or more openings 14 formed therein to form or define one or more bars 15 that are coupled between the plate 11 and the peripheral skirt 12.

The housing 10 includes one or more studs 16 formed therein, such as formed in the peripheral skirt 12 thereof, and one or more pads 17 attached to the studs 16 respectively, for engaging with the supporting surface or ground (not shown), and thus for spacing the housing 10 from the supporting surface or the ground, or for allowing the housing 10 to point contact with the supporting surface or the ground.

The housing 10 includes a barrel 18 extended therefrom, such as extended from the plate 11 thereof, and having a bore 19 formed therein. It is preferable that the bore 19 of the barrel 18 includes a non-circular cross section, or includes one or more flat surfaces formed therein. The barrel 18 includes a peripheral shoulder 181 formed therein, as shown in FIGS. 3–5.

A tube or a handle 20 includes a bore 21 formed therein, and having one end engaged onto the barrel 18 of the housing 10, and attached or secured onto the housing 10 with such as force-fitted engagements, adhesive materials, fasteners, latches, or by welding processes, for allowing the users to hold the handle 20 and to shake or to vibrate the housing 10. The handle 20 includes a peripheral flange 22 extended into the bore 21 thereof, to form or define a reduced orifice 23 therein.

A rod 24 is slideably received in the bore 21 of the handle 20, and includes one end having a shank 25 of a reduced outer diameter than that of the rod 24, in order to form a peripheral shoulder 26 in the one end 25 of the rod 24. The shank 25 is engage able through the reduced orifice 23 of the handle 20, but the rod 24 includes an outer diameter greater than the inner diameter of the reduced orifice 23 of the handle 20, such that the peripheral shoulder 26 of the rod 24 may engage with the peripheral flange 22 of the handle 20, in order to limit the movement of the rod 24 relative to the handle 20.

A knob 27 is attached or secured onto the shank 25 of the rod 24 with such as force-fitted engagements, adhesive materials, fasteners, latches, or by welding processes, for allowing the knob 27 to be moved in concert with the rod 24. The knob 27 is partially and slideably received in the handle 20, and includes an enlarged head 28 formed or provided on the outer end thereof, for allowing the users to comfortably actuate or more the rod 24 relative to the handle 20.

A spring 29 may further be provided and engaged onto the shank 25 of the rod 24, and disposed or engaged between the knob 27 and the peripheral flange 22 of the handle 20; to bias the knob 27 or the head 28 of the knob 27 outwardly or away from the handle 20, and/or to bias the peripheral shoulder 26 of the rod 24 may engage with the peripheral flange 22 of the handle 20, so as to position the rod 24 to the handle 20.

A bell body 30 is received in the housing 10, and includes a frusto-conical form having an aperture 31, such as a non-circular aperture 31 formed on one end thereof (FIGS. 3–5), and aligned with the non-circular bore 19 of the barrel 18. It is preferable that the housing 10 includes one or more projections 110 extended from the plate 11 thereof, and engaged with the bell body 30 (FIGS. 1 and 3–5), for allowing the bell body 30 to point contact with the housing 10, and for increasing the resonance effect of the bell body 30.

A securing device 40 is provided to attach or secure or couple the bell body 30 to the housing 10, and includes a panel 41 for engaging with the inner portion of the bell body 30, to retain the bell body 30 between the panel 41 and the plate 11 of the housing 10. The securing device 40 includes a conduit 42 extended from the panel 41, and engage able through the aperture 31 of the bell body 30, and the bore 19 of the barrel 18.

The conduit 42 includes a non-circular cross section, or one or more flat surfaces 421 formed thereon (FIG. 1), to mate or to engage with the corresponding non-circular aperture 31 of the bell body 30 and the non-circular bore 19 of the barrel 18, and to prevent the securing device 40 and the housing 10 and the bell body 30 from rotating relative to each other, and to suspend the bell body 30 within the housing 10.

The conduit 42 includes a peripheral swelling or catch 44 provided or extended from the free end thereof, to form a peripheral shoulder 45 therein, and to engage with the corresponding peripheral shoulder 181 of the barrel 18, and thus to detachably catch or lock the securing device 40 to the barrel 18 of the housing 10. The conduit 42 preferably includes one or more slots 46 formed therein to increase the resilience of the catch 44 thereof, for facilitating the engagement of the catch 44 with the peripheral shoulder 181 of the barrel 18.

The conduit 42 preferably includes a peripheral rib 43 extended radially into a bore 47 thereof, to engage with the rod 24, and to position the rod 24 to the conduit 42, or to guide the rod 24 to axially move along the conduit 42 without moving laterally. The securing device 40 further includes one or more, such as two ears 48 extended from the panel 41 thereof, and each of the ears 48 includes a hole 49 formed therein.

A seat 50 includes a shaft 51 attached or secured on one end thereof and having one or both ends thereof rotatably engaged in the holes 49 of the ears 48, for allowing the seat 50 to be rotated relative to the panel 41 or the securing device 40 about the shaft 51. The seat 50 includes a cavity 53 formed in the other end 52 thereof, to receive or secure one end of a spring or a resilient member 58 therein. A jinglet, sounder, hammer, tongue, striker or clapper 59 is coupled or secured to the other end of the resilient member 58 for hammering or striking onto the bell body 30. A spring member 54 may be engaged onto the shaft 51, and biased between the securing device 40 and the seat 50, for biasing the seat 50 to engage with the panel 41 of the securing device 40, and/or to engage with the inner end 241 of the rod 24 (FIGS. 3, 5), or for disengaging the clapper 59 from the bell body 30.

In operation, as shown in FIG. 4, when the knob 27 is depressed or forced toward the handle 20 against the spring 29, the inner end 241 of the rod 24 may actuate or force the seat 50 to rotate relative to the securing device 40, and may then force the clapper 59 to hammer or strike against the bell body 30, in order to make sounds.

When the knob 27 and the rod 24 are released, the spring 29 may bias the rod 24 away from the seat 50, and may bias the knob 27 or the head 28 out of the handle 20, for allowing the knob 27 to be depressed or forced toward the handle 20 again. In addition, the spring member 54 may bias the seat 50 to engage with the panel 41 of the securing device 40, and/or to engage with the inner end 241 of the rod 24, or to disengage the clapper 59 from the bell body 30, as shown in FIG. 3.

As shown in FIG. 5, the users may also hold or grasp the handle 20, to vibrate or oscillate or shake or move the housing 10 and the bell body 30, in order to force the clapper 59 to hammer or strike against the bell body 30, and so as to make sounds.

Accordingly, the bell assembly in accordance with the present invention includes a clapper actuatable to strike onto the bell body without moving or shaking the bell body, and strikable onto the bell body by moving or oscillating or shaking the bell body.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A bell assembly comprising:

a bell body, a securing device attached to said bell body, a seat rotatably secured to said securing device with a shaft, and rotatable relative to said securing device about said shaft, a resilient member including a first end secured to said seat, and including a second end, a clapper secured to said second end of said resilient member, means for rotating said seat relative to said securing device, to actuate said clapper to strike against said bell body, and to make sounds, without moving said bell body, and means for biasing said seat to engage with said securing device, and to disengage said clapper from said bell body, said clapper being allowed to strike against said bell body when shaking said bell body.

2. The bell assembly as claimed in claim 1, wherein said bell body includes an aperture formed therein, said securing device includes a panel engaged with said bell body and a conduit extended from said panel and engaged through said aperture of said bell body, to secure said securing device to said bell body.

3. The bell assembly as claimed in claim 2, wherein said securing device includes at least one ear extended from said panel thereof and having a hole formed in said at least one ear, to receive said shaft.

4. The bell assembly as claimed in claim 2 further comprising a housing including a plate having a barrel extended therefrom, said barrel including a bore formed therein to receive said conduit, said panel of said securing device forcing said bell body toward said plate of said housing, to secure said bell body in said housing.

5. The bell assembly as claimed in claim 4, wherein said securing device includes a catch extended from said conduit, to engage with said barrel and to secure said conduit to said barrel.

6. The bell assembly as claimed in claim 5, wherein said barrel includes a peripheral shoulder formed therein to receive said catch of said securing device, and to lock said conduit to said barrel.

7. The bell assembly as claimed in claim 4, wherein said housing includes a first end having said plate provided thereon, and a second end having a peripheral skirt provided thereon, and at least one opening formed therein to form at least one bar therein, said at least one bar is coupled between said plate and said peripheral skirt of said housing.

8. The bell assembly as claimed in claim 7, wherein said housing includes at least one pad attached to said peripheral skirt to make a point-contact with supporting surfaces.

9. The bell assembly as claimed in claim 4, wherein said housing includes at least one projection extended from said plate thereof, and engaged with said bell body, to make a point-contact with said bell body.

10. The bell assembly as claimed in claim 4 further comprising a handle secured to said barrel of said housing, and moved in concert with said housing.

11. The bell assembly as claimed in claim 10, wherein said rotating means includes a rod slidably received in said handle and in said conduit of said securing device, and said rod includes an inner end engageable with said seat, to rotate said seat relative to said securing device against said biasing means when, said rod is moved relative to said handle.

12. The bell assembly as claimed in claim 11, wherein said conduit includes a bore formed therein, and a peripheral rib extended radially into said bore thereof, to engage with said rod, and to guide said rod to move axially along said conduit.

13. The bell assembly as claimed in claim 11, wherein said handle includes a bore formed therein to slidably receive said rod, and includes a peripheral flange extended into said bore thereof, to engage with said rod and to limit said rod to move relative to said handle.

14. The bell assembly as claimed in claim 11, wherein said rod includes a knob secured thereto and extended out of said handle for being depressed by users.

15. The bell assembly as claimed in claim 11, wherein said rod includes a first end extendible out of said handle, and means for biasing said first end of said rod out of said handle, and to disengage said inner end of said rod from said seat.

16. The bell assembly as claimed in claim 2, wherein said aperture of said bell body includes a non-circular cross section, said conduit includes a non-circular cross section to mate with said non-circular aperture of said bell body, and to prevent said securing device from rotating relative to said bell body.

* * * * *